United States Patent [19]

Masuzawa et al.

[11] 3,927,635
[45] Dec. 23, 1975

[54] MARINE AUTOPILOT SYSTEM

[75] Inventors: Isao Masuzawa, Kuki; Tsuneo Awano; Kazutoshi Onishi, both of Yokohama, all of Japan

[73] Assignee: Kabushiki Kaisha Tokyo Keiki, Japan

[22] Filed: Sept. 27, 1974

[21] Appl. No.: 509,854

Related U.S. Application Data

[63] Continuation of Ser. No. 376,344, July 5, 1973, abandoned.

[30] Foreign Application Priority Data

July 10, 1972 Japan.............................. 47-68929

[52] U.S. Cl............ 114/144 E; 235/150.2; 318/588
[51] Int. Cl.².................. B63H 25/04; G05B 11/01
[58] Field of Search .................. 114/144 R, 144 E; 180/79.1; 235/150.2; 244/50, 77 B, 77 E; 318/588

[56] References Cited
UNITED STATES PATENTS 3,505,577  4/1970  Hirokawa........................... 318/588
3,604,907  9/1971  Wesner............................ 235/150.2

Primary Examiner—Trygve M. Blix
Assistant Examiner—Stephen G. Kunin
Attorney, Agent, or Firm—Hill, Gross, Simpson, Van Santen, Steadman, Chiara & Simpson

[57] ABSTRACT

A marine autopilot system having a transducer which produces an electrical signal in correspondence with the deviation of a ship's heading from a set course, a rudder order computer producing an electrical signal corresponding to a rudder command, and a servo loop including a servo amplifier and a relay-like operation device producing a rudder command. The relay-like operation device has a circuit for making the on-voltage substantially equal to the hysteresis and the servo amplifier has a circuit for adjusting the gain as a weather adjustment device.

2 Claims, 7 Drawing Figures

MARINE AUTOPILOT SYSTEM

This is a continuation, of application Ser. No. 376,344, filed July 5, 1973, now abandoned.

BACKGROUND OF THE INVENTION

1. Field of the Invention

The present invention relates generally to a marine autopilot system, and more particularly to a marine autopilot system with a weather adjustment device necessary to the autopilot system.

2. Description of the Prior Art

In a prior art marine autopilot system with a weather adjustment device, an output is delayed relative to an input. This delay of the output relative to the input reduces the stability of the automatic steering loop and causes yawing with a long period. As a result, increase of resistance or propulsion power loss of power in a shsip is caused.

SUMMARY OF THE INVENTION

It is a main object of the present invention to provide a marine autopilot system free from the defects encountered in the prior art.

It is another object of the present invention to provide a marine autopilott system which is provided with a novel weather adjustment device.

The additional and other objects, features and advantages of the present invention will become apparent from the following description taken in conjunction with the accompanying drawing.

DESCRIPTION OF THE PREFERRED EMBODIMENT

Figure 1:
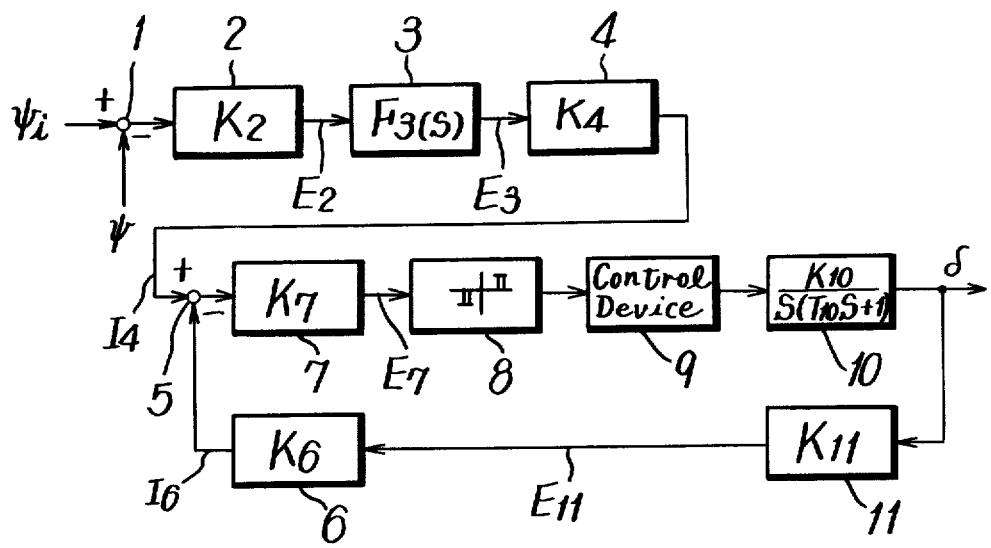
FIG. 1 is a block diagram of a conventional marine autopilot system.

With reference to FIG. 1, an example of a prior art marine autopilot system will be now described for better understanding of the present invention.

In FIG. 1, reference numeral 1 designates an adder which produces a difference or deviation between a ship's heading $\psi$ and a set course $\psi_i$. The output of the adder 1 or the deviation angle $\psi_i - \psi$ is converted to the corresponding electrical voltage signal $E_2$ by a transducer 2. The voltage signal $E_2$ is then applied to a rudder order computer 3 to produce a voltage signal $E_3$ which is converted through an input network 4 into a current signal $I_4$. An output of the whole system or a rudder angle $\delta$ is converted by a transducer 11 into a voltage signal $E_{11}$ which is then converted through a feedback network 6 into a current signal $I_6$. The current signal $I_6$ is fed back to an adding point 5. The current signals $I_4$ and $I_6$ are fed through the adding point 5 to a servo amplifier 7 which produces the corresponding voltage signal $E_7$ which is then applied to a relay-like operation device 8. When the relay-like operation device 8 operates, a control device 9 for reversible drive is operated to drive a power unit 10 to steer the ship by the rudder angle $\delta$.

In the system of FIG. 1, the transducers 2 and 11 may be a potentiometer or a combination of a synchromotor and a demodulator or an electromagnetic pick-off circuit and the like; the relay-like operation device 8 may be a mechanical relay, Schmitt circuit, a comparator or a semicondutor device for achieving a relay-like operation; and the control device 9 may be a high power relay or semiconductor device such as a reverse blocking triode thyristor, a bidirectional triode thyristor or a power transistor which have a large enough capacity for driving the power unit 10. Further, as the power unit 10 a DC motor, an AC motor or a hydraulic motor may be used, and as the rudder order computer 3 various devices may be used in view of the characteristics inherent in the autopilot system.

Making use of reference numerals of the respective parts in FIG. 1, the output voltage $E_7$ from the amplifier 7, which amplifies the error of the servo loop, is expressed by the following equation (1):

$$E_7 = K_7 (I_4 - I_6) \\ = K_7\{K_2K_3F_3(S)(\psi_i - \psi) - K_6K_{11}\delta\} \quad (1)$$

where $F_3(S)$ is the characteristic of the device 3.

If it is taken that the gain $K_7$ of the amplifier 7 is great enough, the characteristic of the marine autopilot system shown in FIG. 1 can be expressed by the following equation (2) based upon equation (1):

$$\frac{\delta}{\psi_i - \psi} = \frac{K_2K_4}{K_6K_{11}} F_3(S) \quad (2)$$

The characteristic $F_3(S)$ of the rudder order computer 3 is different because the autopilot system achieves proportional control, (proportional + differential) control, or (proportional + differential + integral) control, For example, in the case of the autopilot system achieving (proportional + differential + integral) control, the characteristic $F_3(S)$ is expressed as follows:

$$F_3(S) = K_3 (1 + T_D S) \left(1 + \frac{1}{T_I S}\right) \quad (3)$$

where $T_D$ represents a derivative time and $T_I$ an integral time.

The marine autopilot system is provided, in addition to the adjusting device for the derivative time $T_D$ and the integral time $T_I$, with a device for adjusting the proportional constant or rudder angle ratio adjustment. If the rudder angle ratio is taken as $K_P$, this rudder angle ratio $K_P$ in the above example is given as follows:

$$K_P = \frac{K_2K_3K_4}{K_6K_{11}} \quad (4)$$

Accordingly, the rudder angle ratio $K_P$ can be adjusted by varying $K_2$, $K_3$, $K_4$, $K_6$ and $K_{11}$. However, the sensitivity for the input to the autopilot system or the deviation $\psi_i - \psi$) is not affected by the adjusted value of the rudder angle ratio adjustment. In other words, the rudder angle ratio is normally adjusted by varying the characteristic $K_6$ or $K_{11}$ as will be apparent from equations (1) to (4).

In the example of FIG. 1, it may be possible that the rudder order computer 3 is entirely or partially accommodated in the input network 4.

In general, the marine autopilot system is provided with an adjusting mechanism such as a weather adjustment device. A ship is subjected to rolling, pitching, yawing and the like by various external disturbances when she navigates on sea and these unnecessary motions cause directly or indirectly the deviation of ship's heading from the set course. Accordingly, the input to the autopilot system or the deviation ($\psi_t - \psi$) contains therein a component of the deviation caused by the external disturbances. It is ineffective for keeping the ship's heading on the set course to operate the rudder in response to such deviation, having short periods, and such steering attempts add to the losses. Such unnecessary steering causes short life spans of the steering engine, the motor or a solenoid value of the power unit of the autopilot system, so that it is necessary to avoid steering operations for such external disturbances having short periods. Further, deviation signals of long periods are caused by the oscillations of the autopilot system excited by the external disturbances and their amplitudes may become high, so that it is required to keep the ship's heading on the set course that steering occurs when the deviation signal exceeds a predetermined value and hence to return the ship's heading on the set course. In practice, since the deviation signal includes therein a long period signal and a short period signal which are superimposed, when the deviation signal is lower than a predetermined value, no steering is carried out to avoid useless steering operations, but when the deviation signal exceeds the predetermined value, steering operation is performed to return the ship's heading to the set course. To this end, the weather adjustment device is provided. In practice, the weather adjustment is carried out by any one of the adder 1, the rudder order computer 3 and the input network 4, or the servo amplifier 7. Among these, if the weather adjusting is achieved by the servo amplifier 7, no complicated mechanism or additional circuits ar required and hence the weather adjustment is performed with a small device and a low cost. Accordingly, this method has been employed widely.

Figure 3:
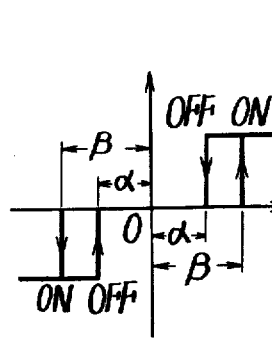
FIGS. 3A and 3B are graphs for illustrating the characteristic of a conventional marine autopilot system.
Figure 3:
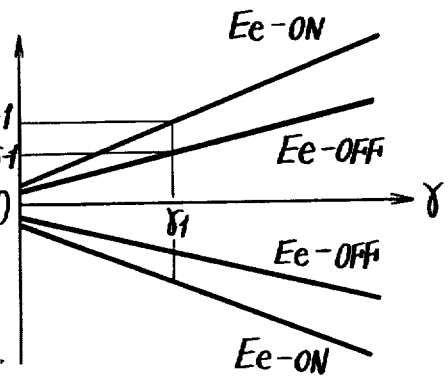

In the prior art marine autopilot systems, a mechanical relay or a relay-like operation element formed of a semiconductor element such as a transistor and such has been used as the relay-lkie operation device δ which has a characteristic as shown in FIG. 3A, and the weather adjustment has been achieved by varying the gain $K_7$ of the servo amplifier 7.

If the output $E_7$ of the servo amplifier 7 is determined by the output $E_3$ of the rudder order computer 3 and the feedback voltage signal $E_{11}$, the following equation (5) is obtained:

$$E_7 = K_4 K_7 \left( E_3 - \frac{K_6}{K_4} E_{11} \right) \quad (5)$$

In the equation (5), the input deviation voltage $$\left( E_3 - \frac{K_6}{K_4} E_{11} \right),$$

which corresponds to the servo error, is expressed by the following $E_e$.

$$E_e = E_3 - \frac{K_6}{K_4} E_{11} \quad (6)$$

When the output $E_7$ of the servo amplifier 7 reaches the onlevel $\beta$ and the off-level $\alpha$ of the conventiona relay-like operation device 8, the device 8 is made conductive and nonconductive, respectively. If the input deviation voltage $E_e$ at the on- and off-states is taken as $E_{e\text{-}ON}$ and $E_{e\text{-}OFF}$, respectively, the following equation (7) can be derived from the equations (5) and (6):

$$|E_{e\text{-}ON}| = \left| \frac{\beta}{K_4 K_7} \right|$$
$$|E_{e\text{-}OFF}| = \left| \frac{\alpha}{K_4 K_7} \right| \quad (7)$$

If the adjusting scale $\gamma$ of the weather adjustment device is to be inversly proportional to the absolute value of the gain $K_7$ of the servo amplifier $7|K_7|$, the characteristic of the conventional weather adjustment device, will be as shown in FIG. 3B.

Assuming that the adjusting scale $\gamma$ is equal to $\gamma_1$ ($\gamma = \gamma_1$) and the input $E_3$ to the input network 4 is a sine wave, the response of the conventional servo system will be as follows. For the sake of brevity, if it is assumed that $K_6 = K_4$ and $E_e = E_3 - E_{11}$, the characteristic of a conventional autopilot system can be shown as a dotted lime $a$ in FIG. 5. That is, the voltage $E_{11}$ shown as dotted line $a$ can be deemed to show the response to the output from the prior art system shown in FIG. 1.

Figure 5:
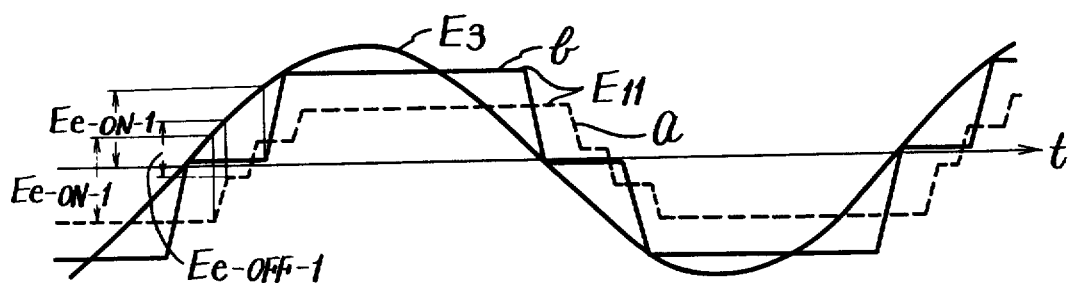
FIG. 5 is a graph used for explaining the operations of the conventional system and the system of the invention.

One of the defects of the prior art system is the delay of the output relative to the input as apparent from FIG. 5. This delay of the response will mean that if the autopiloting of a ship is carried out with the prior art system, the stability of the autopilot loop will deteriorate and yawing having a long period will be generated with the result that increase in resistance or propullsive power loss will be generated, which is uneconimical for the voyage.

Figure 2:
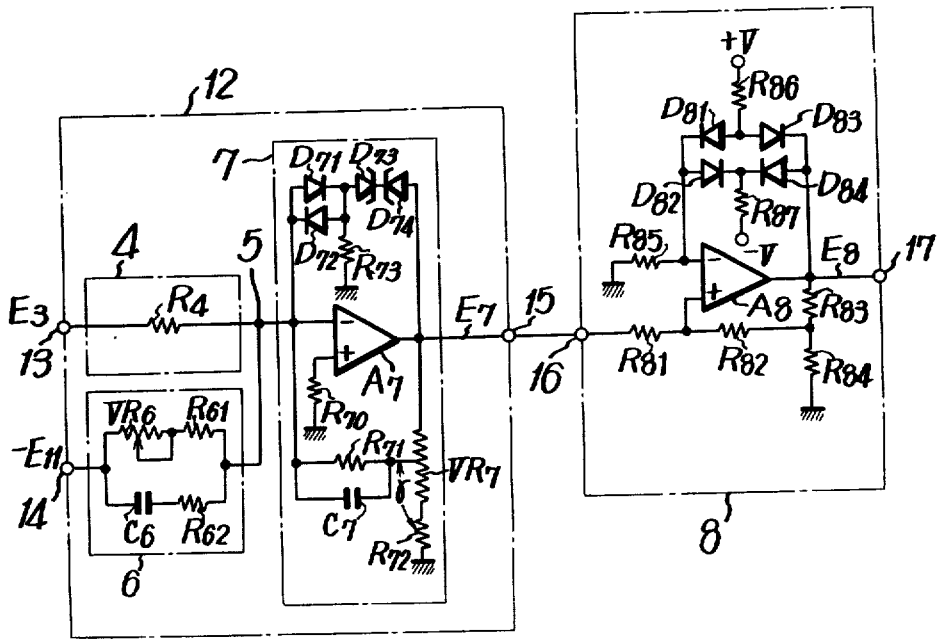
FIG. 2 is a circuit diagram for showing a main part of an example of the invention.

An example of the present invention, which is free from the drawbacks inherent in the prior art, will be hereinafter described with reference to FIG. 2 in which reference numerals similar to those of FIG. 1 indicate similar elements. In FIG. 2, only parts 4, 5, 6, 7 and 8 are shown byt the other parts are the same as those of FIG. 1.

In the embodiment of the present invention shown in FIG. 2, the input network 4 consists o a resistor $R_4$, and the feedback network 6 is composed of a first series connection of a variable resistor $VR_6$ for adjusting the rudder angle ratio and a resistor $R_{61}$ and a second series connection of a capacitr $C_6$ and a resistor $R_{62}$ for the stabilization of the servo loop, the first and second series connections are connected in parallel with each other. Further, the servo amplifier 7 consists of an operational amplifier $A_7$, a variable resistor $VR_7$ for the gain adjustment thereof, a resistor $R_{72}$ and a feedback resistor $R_{71}$ which are connected as shown in FIG. 2. The servo amplifier 7 further includes a capacitor $C_7$ for filtering noise, diodes $D_{71}$ and $D_{72}$, Zenor diodes $D_{73}$ and $D_{74}$, and a resistor $R_{73}$ which are connected as shown in FIG. 2 to form a circuit for limiting the output of the operational amplifier 7. In FIG. 2, the point corresponding to the adding point 5 of FIG. 1 is the negative input terminal of the operational amplifier $A_7$. Thus, block 12 includes the blocks 4, 5, 6 and 7 and has basically the operational characteristics of an adding amplifier which is well known. The adding amplifier 12 is provided with tow input terminals 13 and 14, the one of which or the input terminal 13 is supplied with the output $E_3$ of the rudder order computer 3, while the other of which or the input terminal 14 is supplied with the feedback signal $-E_{11}$. At an output terminal 15 of the adding amplifier 12, there appears the output signal $E_7$ which is fed to an input terminal 16 of the relay-like operation device 8. For this reason, the adding amplifier is designated as a servo amplifier in this embodiment. For the sake of simplicity, if the capacitor $C_6$ and $C_7$ are neglected, the output $E_7$ is expressed by the following equation (8):

$$E_{11} = -\frac{VR_7+R_{72}}{\gamma VR_7+R_{72}} \cdot \frac{R_{71}}{R_4} \left( E_3 - \frac{R_4}{VR_6+R_{61}} E_{11} \right) \quad (8)$$

where $\gamma$ shows the position of the movable contact of the variable resistor $VR_7$ as shown in FIG. 2.

As shown in FIG. 2, the relay-like operation device 8 is formed by an operational amplifier $A_8$, a diode bridge consisting of diodes $D_{81}$, $D_{82}$, $D_{83}$ and $D_{84}$ and connected at one of its diagonal points between the output terminal and the negative input terminal of the operational amplifier $A_8$, resistors $R_{86}$ and $R_{87}$ connected between a positive electrical power source $+V$ and one of the other diagonal points of the diode bridge and between a negative electrical power source $-V$ and the other of the other diagonal points of the diode bridge, a resistor $R_{85}$ connected between the negative input terminal of the operational amplifier $A_8$ and the earth, a series connection of resistors $R_{83}$ and $R_{84}$ connected between the output terminal of the operational amplifier $A_8$ and the earth, and a series connection of resistors $R_{81}$ and $R_{82}$ connected between the input terminal 16 of the device 8 and the connection point of the resistor $R_{83}$ with the resistor $R_{84}$, the connection point between the resistors $R_{81}$ and $R_{82}$ being connected to the positive input terminal of the operational amplifier $A_8$.

When the input $E_7$ to the device 8 becomes equal to $\beta(E_7=\beta)$, the device 8 turns on. The on-level $\beta$ is given by the following equation (9) when the resistance values of the resistors $R_{86}$ and $R_{87}$ are equal.

$$\beta = \left(1 + \frac{R_{81}}{R_{82}+R_{83}//R_{84}} \cdot \frac{R_{83}}{R_{83}+R_{84}} \right) \frac{R_{85}}{R_{85}+R_{86}}$$
$$(V-V_D) - \frac{R_{81}}{R_{82}+R_{83}//R_{84}} \cdot \frac{R_{84}}{R_{83}+R_{84}} V_D \quad (9)$$

where $V_D$ is a voltage drop in the forward direction of the diode and the mark // represents a parallel resistance.

Further, if the output of the operational amplifier $A_8$ is assumed as $E_8$ and its saturation output amplitude as $E_{8S}$, the off-level $\alpha$ of the relay-like operation device 8 becomes zero when the following equation (10) is satisfied.

$$\frac{E_{8S}}{V-V_D} = \left(1+ \frac{R_{82}+R_{83}//R_{84}}{R_{81}} \right) \frac{R_{83}+R_{84}}{R_{84}} \cdot \frac{R_{85}}{R_{85}+R_{86}} \quad (10)$$

Figure 4:
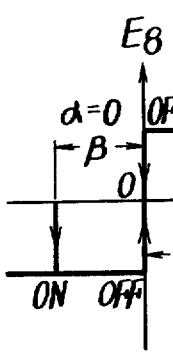
FIGS. 4A and 4B are graphs for illustrating the characteristic of the system of the invention.
Figure 4:
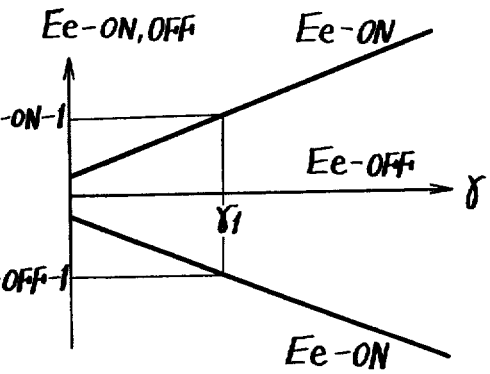

The characteristic of the device 8 is shown in FIG. 4A, which shows the case where the input $E_7$ is zero which places the device 8 in the off-state.

The output $E_7$ of the servo amplifier 7 is applied to the relay-like operation device 8 with the characteristic described above. When the absolute value of the output $E_7(|E_7|)$ becomes equal to $\beta$, the relay-like operation device 8 will trn on. The value $|E_{e-ON}|$ of the input deviation voltage $E_e$ at that time is given by the following equation (11) based upon the equation (8):

$$|E_{e-ON}| = \frac{R_4}{R_{71}} \cdot \frac{\gamma VR_7+R_{72}}{VR_7+R_{72}} \beta \quad (11)$$

where $E_e = E_3 - \frac{R_4}{VR_6+R_{61}} E_{11}$

In the meantime, when $E_7 = 0$ or $E_e = 0$, the relay-like operation device 8 will be in the off-state, so that the following equation (12) is established.

$$|E_{e-OFF}| = 0 \quad (12)$$

FIG. 4B is a graph for showing the equations (11) and (12), respectively and hence this graph shows the characteristic of the weather adjustment device of the present invention. As apparent from the graph of FIG. 4B, when the position $\gamma$ of the movable contact of the variable resistor $VR_7$, which adjust the gain $K_7$ of the servo amplifier 7, is changed, the input deviation signal $E_e$ or $|E_{e-ON}|$, which is fed to the servo amplifier 7 to make the relay-like operation device 8 turn on, is changed proportional to $\gamma$, while the input deviation signal $E_e$ for making the relay-like operation device 8 turn off or $|E_{e-OFF}|$ is zero irrespective of $\gamma$. Thus $\gamma$ is used as the set scale of the weather adjustment device.

If the circuit of the present invention shown in FIG. 2, in which the weather adjustment device described as above is employed, is applied to the autopilot system and if it is assumed that $\gamma = \gamma_1$ and the input to the input network 4 or the input $E_3$ is taken as a sine wave, the response of the system is as follows. For the sake of brevity, if the case where $R_4 = VR_6 + R_{61}$ and $E_e = E_3 - E_{11}$ are satisfied is considered, the operaton can be shown in FIG. 5. In FIG. 5, a solid line $b$ designates the voltage $E_{11}$ proportional to the output $\delta$ of the autopilot system according to the present invention. That is, the voltage $E_{11}$ shown in FIG. 5 by the solid line $b$ is considered to represent the output response of the autopilot system according to the present invention.

When the response characteristic of the present invention shown by the curve $b$ is compared with that of the prior art shown by the dotted curve $a$ in FIG. 5, the following advantages become apparent.

1. First of all, the response characteristic of the invention is little in lag to the input as compared with the prior art, which will mean that the system of the invention reduces the drawback of the prior art system described above. In other words, the present invention does not disturb the stability of the autopilot system, and hence supresses the generation a yawing of long period to avoid the loss.

2. In the system of the invention, no offset is generated in the servo system. That is, when the input increases to make the relay-like operation device 8 turn on, an output which is coincidence with the input or the rudder $\delta$ is produced. This is very important for the case where the rudder order computer 3 is an autopilot system with the [proportional + derivative + integral] controls as expressed by the equation (3). By the integral control, the rudder order, which will be in equilibrium with a low frequency component of the external disturbance, especially DC components, is calculated by the rudder order computer 3. The system of the invention will accurately steer the ship in response to the calculated rudder order without offset. On the contrary, with the prior art system, an offset is generated in the servo system so that the system does not steer the ship in response to the calculated rudder order correctly with the result that yawing with a long period may be produced.

3. In the system of the invention when the input signal $E_3$ to the servo device becomes great or the ship's heading remains deviated from the set course, the relay-like operation device 8 will turn on to steer the ship. This will mean that the system acts as the weather adjustment device as in the prior art system. In this case, however, according to the invention, the rudder angle practically steered is in coincidence with the signal $E_3$ which is calculated by the rudder order computer 3 as described in item (2). The calculated value by the rudder order computer 3 implies an amount of the rudder angle which may be necessary to return the ship's heading to the set course in view of the deviation angle signal corresponding to the position of the ship at the time. Accordingly, when the relay-like operation device 8 is once turned on, the rudder angle in coincidence with the calculated value is steered for the ship.

With the system of the invention, the autopilot characteristics, especially the course keeping ability is much improved as compared with the prior art systems.

4. As apparent from FIG. 5, the number of on-off operations of the relay-like operation device 8, the number of operations of the power unit 10, and the number of the steering operations is reduced greatly as compared with that of the prior art. The characteristic of this invention will mean that the life of the motor of the power unit, the life of the solenoid value of the power unit and the life of the steering engine are much prolonged.

The system of the present invention with the advantages mentioned above is composed of the amplifier for amplifying the servo error and the relay-like operation device whose off-level is zero, so that no specific additional parts to the prior art system is required. Thus, the system of the invention can be incorporated by improving or changing some parts of existing prior art systems and hence is low cost.

If may be also apparent that a circuit which is formed of Schmitt circuit consisting of a transistor, an IC comparator and a comparator formed of analogue IC or digital IC and so on have operational characteristics similar to that shown in FIG. 4A, can be used instead of the relay-like operation device 8 shown in FIG. 2.

In the example of the invention shown in FIG. 2, the off-level of the relay-like operation device 8 is selected to be zero or its input voltage $E_7$ is selected to be zero, but it will be apparent that even if the input voltage $E_7$ is not exactly zero but approximately zero, the same characteristics and effect can be achieved.

Further, in the above description the operation and effect of the capacitor $C_8$ and the resistor $R_{62}$ in the feedback circuit 6 of the adding amplifier 12 shown in FIG. 2 are omitted for the sake of the brevity, but these elements are provided for stabilization of the servo loop.

It will be apparent that many modifications and variations can be made without departing from the spirits and scope of the novel concepts of the present invention.

We claim as our invention:

1. A marine autopilot system comprising, a first transducer for producing an electrical signal corresponding to the deviation of a ship's heading from a set course; a first means for producing an electrical signal corresponding to a rudder order receiving the output of said first transducer; a servo loop including a servo amplifier and a relay-like operation device for producing a rudder command receiving the electrical signal from said first means; a means provided in said relay-like operation device for making its off-voltage substantially zero and its on-voltage substantially equal to its hysteresis voltage, and an adjusting means provided in said servo amplifier for adjusting its gain, whereby the voltage of said signal applied to said servo loop which makes said relay-like operation device turn on, can be changed in accordance with a gain determined by said adjusting means and the voltage of said signal applied to said servo loop, which makes said relay-like operation device turn off, is kept at substantially zero irrespective of said adjusted gain, said relay-like operation device including a first operational amplifier and a circuit connected between the negative input terminal and the output terminal of said first operational amplifier for achieving relay-like operation, said means provided in said relay-like operation device being provided in a positive feedback circuit of said first operational amplifier for making off-voltage substantially zero, said servo amplifier including a second operational amplifier and said adjusting means connected in a negative feedback circuit of said second operational amplifier, said negative feedback circuit including a variable resistor and a feedback resistor and said variable resistor serving as a weather adjustment device.

2. An autopilot for a ship having a rudder comprising a first transducer producing a signal proportional to a ship's deviation from a desired heading, a rudder order computer receiving the output of said first transducer, a servo loop including a servo amplifier receiving the output of said rudder order computer, a relay-like operation device connected to said servo amplifier and producing either off-state voltages or on-state voltages of opposite polarities, a control device and power unit connected to said relay-like operation device and moving the rudder, a rudder position transducer connected to said power unit to produce a signal proportional to rudder position, a feedback network receiving the output of said rudder position transducer and supplying an input to said servo amplifier, and gain adjusting means in said servo amplifier to allow the signal level which turns on said relay-like operation device to turn on to be adjusted without causing its turn-off voltage from changing from zero, said relay-like operation device including a first operational amplifier, a circuit connected between the negative input terminal and the output terminal of said first operational amplifier for achieving relay-like operation, and means provided in said relay-like operation device in a positive feedback circuit fo said first operational amplifier for making off voltages substantially zero, said servo amplifier including a second operational amplifier and said adjusting means connected in a negative feedback circuit of said second operational amplifier, said negative feedback circuit including a variable resistor and a feedback resistor and said variable resistor serving as a weather adjustment device.

* * * * *